(12) United States Patent
Ball et al.

(10) Patent No.: US 9,709,936 B1
(45) Date of Patent: Jul. 18, 2017

(54) CONTROL FOR A FUSER OF AN ELECTROPHOTOGRAPHIC IMAGING DEVICE WHICH DETERMINES CURRENT LINE VOLTAGE

(71) Applicant: Lexmark International, Inc., Lexington, KY (US)

(72) Inventors: Steve Brennen Ball, Lexington, KY (US); Jichang Cao, Lexington, KY (US); Christopher Edward Rhoads, Georgetown, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 15/099,261

(22) Filed: Apr. 14, 2016

(51) Int. Cl.
  *G03G 15/00* (2006.01)
  *G03G 15/20* (2006.01)
  *G06F 1/30* (2006.01)

(52) U.S. Cl.
  CPC ....... *G03G 15/205* (2013.01); *G03G 15/5004* (2013.01); *G06F 1/305* (2013.01)

(58) Field of Classification Search
  CPC .. G03G 15/205; G03G 15/5004; G03G 15/80; G06F 1/26; G06F 1/305
  USPC ............................................. 399/33, 70, 88
  See application file for complete search history.

(56) References Cited

U.S. PATENT DOCUMENTS

| | | | | |
|---|---|---|---|---|
| 4,928,055 A | * | 5/1990 | Kaieda | H05B 39/08 323/235 |
| 2010/0166446 A1 | * | 7/2010 | Naganawa | G03G 15/2039 399/69 |
| 2011/0020019 A1 | * | 1/2011 | Schneider | G03G 15/5004 399/39 |

FOREIGN PATENT DOCUMENTS

| JP | 2010026446 A | * | 2/2010 | |
| JP | 2010156754 A | * | 7/2010 | G03G 15/2039 |
| JP | 2013120310 A | * | 6/2013 | |

* cited by examiner

*Primary Examiner* — Robert Beatty

(57) ABSTRACT

A system and method for controlling the fuser heater of an electrophotographic imaging device, including determining an initial temperature of the fuser heater; calculating a plurality of warm-up times for heating the fuser heater to a first predetermined temperature based on the initial temperature and a plurality of previously determined warm-up times taken over a plurality of line voltages and stored in memory of the electrophotographic device; determining an actual warm-up time for heating the fuser to the first predetermined temperature; selecting a first calculated warm-up time and a second calculated warm-up time from the plurality of calculated warm-up times; determining a first line voltage value and a second line voltage value corresponding to the first and second warm-up times, respectively, and calculating a current line voltage based on the actual warm-up time, the first and second calculated warm-up times, and the first and second line voltage values.

20 Claims, 7 Drawing Sheets

CONTROL FOR A FUSER OF AN ELECTROPHOTOGRAPHIC IMAGING DEVICE WHICH DETERMINES CURRENT LINE VOLTAGE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to fuser control in an electrophotographic imaging device, and particularly to an apparatus and methods for more effectively and efficiently controlling the fuser assembly of an imaging device.

2. Description of the Related Art

Alternating current (AC) line voltage and power quality across the world are not always within listed specifications and often vary considerably. This can be due to problems and shortcomings with the power grid or even with the power distribution inside a building. The line voltage or power quality variation has a substantial impact on the operation of electrophotographic printing devices, and particularly on printer performance because fuser heater power changes dramatically with AC line voltage variation. Fuser heater power variations have been seen to cause a number of problems. For instance, excessive fuser heater power for a belt fuser, from an AC line voltage being too high, increases the likelihood of cracking the fuser heater in the belt fuser. Low fuser heater power, from an AC line voltage being too low, often leads to insufficient fusing of toner to sheets of media because the fuser heater cannot maintain a suitable fusing temperature for acceptable toner fusing. When fusing temperatures cannot be maintained at a sufficiently high temperature during a printing operation, the printing device may stop printing altogether and issue an error, often leading to a disruption in work by those needing timely printed material.

Significant fuser heater power variation also makes it difficult to predict the amount of time needed for a fuser to be ready for performing fusing during a print operation. Inaccurate prediction of such "fuser ready time" may cause poor toner fusing because media sheets enter into the fuser nip of the fuser assembly too early or arrive too late, oftentimes leading to the imaging device flagging an error and stopping the print job before completion. Further, sizeable power variations make it difficult to achieve relatively tight temperature control of the fuser heater. Sizeable variation in fuser heater temperature during a print operation has been seen to cause a "hot offset" condition in which toner is undesirably transferred to the belt of the fuser assembly when fusing temperatures are too high, resulting in the transferred toner transferring back to the media sheet one belt revolution later. Further, toner that is fused at elevated temperatures, relative to typical fusing temperatures, oftentimes has a dull appearance.

Still further, fusing toner at elevated temperatures can result in media sheets undesirably wrapping around the belt of the fuser assembly instead of exiting therefrom, thereby leading to a media jam condition and a further disruption in printing.

To address the above challenges, some existing imaging devices use the time it takes for a fuser heater to be warmed to fusing temperatures in order to predict the AC line voltage. However, such predictions are often inaccurate due to the fuser heater warm up time being influenced by other factors such as variation of initial fuser heater temperature prior to the fuser heater warm up operation, variation in fuser heater resistance distribution, variation in fuser heater thickness, and variation in the operation of the thermistor which is secured to the fuser heater and the connection between the thermistor and the fuser heater.

SUMMARY

Example embodiments are directed to methods of and systems for effectively managing the power and otherwise controlling the fuser assembly of an electrophotographic imaging device.

In accordance with one example embodiment, there is disclosed a method for controlling a fuser heater of a fuser assembly for an electrophotographic device, including determining, by the electrophotographic device, an initial temperature of the fuser heater; calculating, by the electrophotographic device, a plurality of warm-up times for heating the heater to a first predetermined temperature based on the initial temperature and a plurality of previously determined warm-up times stored in memory of the electrophotographic device, the previously determined warm-up times being taken over a plurality of line voltages; determining, by the electrophotographic device, an actual warm-up time for heating the fuser heater to the first predetermined temperature from a second predetermined temperature less than the first predetermined temperature; selecting, by the electrophotographic device, a first calculated warm-up time and a second calculated warm-up time from the plurality of calculated warm-up times, the first calculated warm-up time being a smallest calculated warm-up time that is greater than the actual warm-up time, and the second calculated warm-up time being a largest calculated warm-up time that is less than the actual warm-up time; determining, by the electrophotographic device, a first line voltage value corresponding to the first calculated warm-up time, and a second line voltage value corresponding to the second calculated warm-up time; and calculating, by the electrophotographic device, a current line voltage based on the actual warm-up time, the first and second calculated warm-up times, and the first and second line voltage values.

Also disclosed, according to an example embodiment, is an imaging device including a photoconductive member; a developer unit for developing a toner image on the photoconductive member; at least one toner transfer area for transferring the toner image to a sheet of media as the sheet of media passes through the toner transfer area in a media feed direction along a media feed path of the imaging device; a fuser assembly positioned downstream of the at least one toner transfer area in the media feed direction for fusing toner transferred to the sheet of media, the fuser assembly including a fuser heater member; a power supply circuit coupled to the fuser assembly for supply power thereto; and a controller coupled to the power supply circuit and the fuser assembly for controlling an amount of heat generated by the fuser heater member, and memory coupled to the controller. In the example embodiment, the controller is configured to execute instructions stored in the memory for determining an initial temperature of the fuser heater; calculating a plurality of warm-up times for heating the heater to a first predetermined temperature based on the initial temperature and a plurality of previously determined warm-up times stored in memory of the electrophotographic device, the previously determined warm-up times being taken over a plurality of line voltages; determining an actual warm-up time for heating the fuser heater member to the first predetermined temperature from a second predetermined temperature less than the first predetermined temperature; selecting a first calculated warm-up time and a second calculated warm-up time from the plurality of calculated warm-up times, the first calculated warm-up time being a smallest calculated warm-up time that is greater than the actual warm-up time and the second calculated warm-up time being a largest calculated warm-up time that is less than the actual warm-up time; determining a first line voltage value corresponding to the first calculated warm-up time and a second line voltage value corresponding to the second calculated warm-up time; and calculating a current line voltage based on the actual warm-up time, the first and second warm-up times, and the first and second line voltage values. With the line voltage calculated in this manner, the imaging device then more effectively controls the operation of the fuser assembly and other components and modules of the imaging device based upon the calculated line voltage.

BRIEF DESCRIPTION OF THE DRAWINGS

The above-mentioned and other features and advantages of the disclosed example embodiments, and the manner of attaining them, will become more apparent and will be better understood by reference to the following description of the disclosed example embodiments in conjunction with the accompanying drawings, wherein.

DETAILED DESCRIPTION

Figure 1:
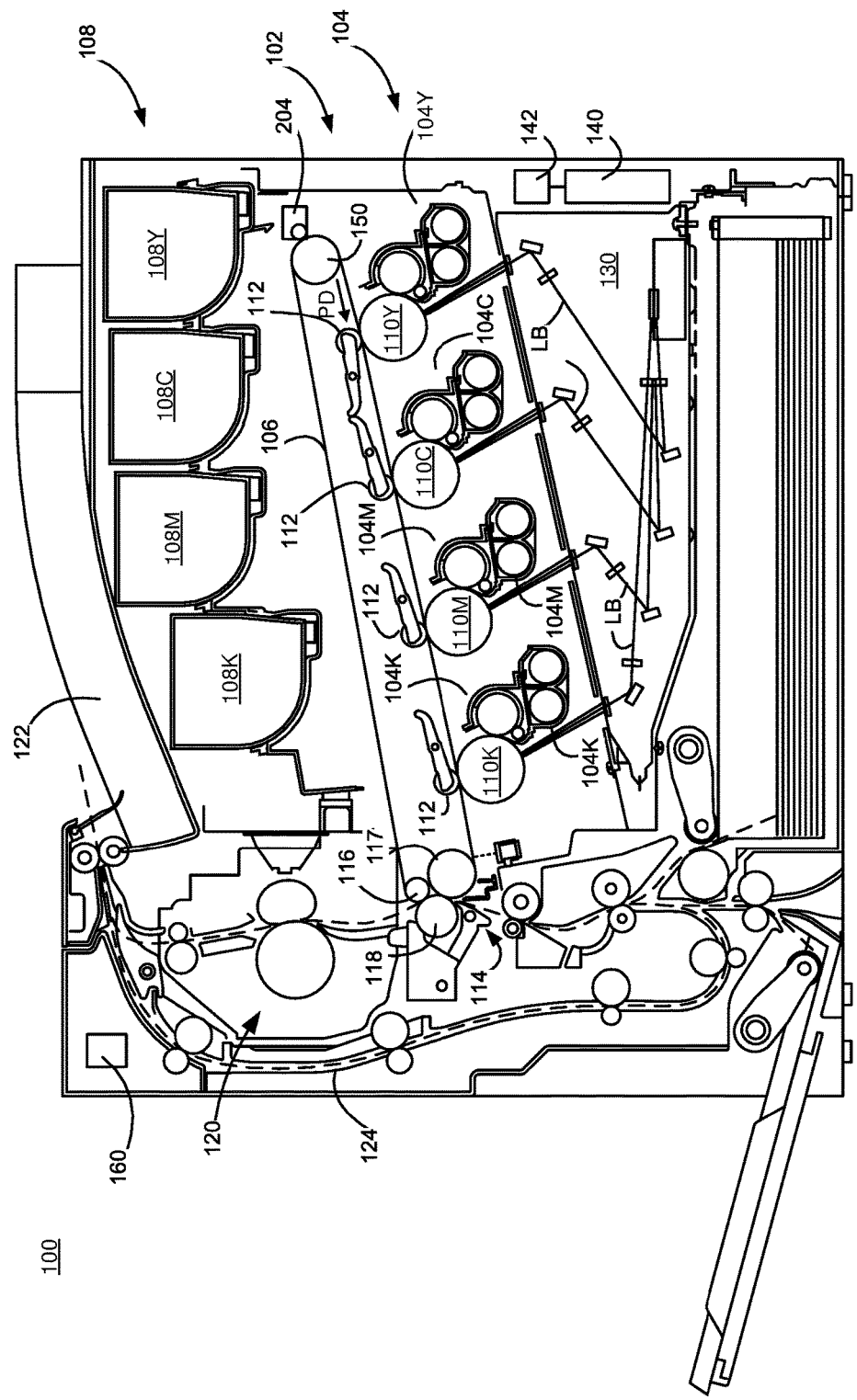
FIG. 1 is a side elevational view of an imaging device according to an example embodiment.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and positionings. In addition, the terms "connected" and "coupled" and variations thereof are not restricted to physical or mechanical connections or couplings.

Spatially relative terms such as "top", "bottom", "front", "back" and "side", and the like, are used for ease of description to explain the positioning of one element relative to a second element. Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

FIG. 1 illustrates a color imaging device 100 according to an example embodiment. Imaging device 100 includes a first toner transfer area 102 having four developer units 104Y, 104C, 104M and 104K that substantially extend from one end of imaging device 100 to an opposed end thereof. Developer units 104 are disposed along an intermediate transfer member (ITM) 106. Each developer unit 104 holds a different color toner. The developer units 104 may be aligned in order relative to a process direction PD of the ITM belt 106, with the yellow developer unit 104Y being the most upstream, followed by cyan developer unit 104C, magenta developer unit 104M, and black developer unit 104K being the most downstream along ITM belt 106.

Each developer unit 104 is operably connected to a toner reservoir 108 for receiving toner for use in a printing operation. Each toner reservoir 108Y, 108C, 108M and 108K is controlled to supply toner as needed to its corresponding developer unit 104. Each developer unit 104 is associated with a photoconductive member 110Y, 110C, 110M and 110K that receives toner therefrom during toner development in order to form a toned image thereon. Each photoconductive member 110 is paired with a transfer member 112 for use in transferring toner to ITM belt 106 at first transfer area 102.

During color image formation, the surface of each photoconductive member 110 is charged to a specified voltage, such as −800 volts, for example. At least one laser beam LB from a printhead or laser scanning unit (LSU) 130 is directed to the surface of each photoconductive member 110 and discharges those areas it contacts to form a latent image thereon. In one embodiment, areas on the photoconductive member 110 illuminated by the laser beam LB are discharged to approximately −100 volts. The developer unit 104 then transfers toner to photoconductive member 110 to form a toner image thereon. The toner is attracted to the areas of the surface of photoconductive member 110 that are discharged by the laser beam LB from LSU 130.

ITM belt 106 is disposed adjacent to each of developer unit 104. In this embodiment, ITM belt 106 is formed as an endless belt disposed about a backup roll 116, a drive roll 117 and a tension roll 150. During image forming or imaging operations, ITM belt 106 moves past photoconductive members 110 in process direction PD as viewed in FIG. 1. One or more of photoconductive members 110 applies its toner image in its respective color to ITM belt 106. For mono-color images, a toner image is applied from a single photoconductive member 110K. For multi-color images, toner images are applied from two or more photoconductive members 110. In one embodiment, a positive voltage field formed in part by transfer member 112 attracts the toner image from the associated photoconductive member 110 to the surface of moving ITM belt 106.

ITM belt 106 rotates and collects the one or more toner images from the one or more developer units 104 and then conveys the one or more toner images to a media sheet at a second transfer area 114. Second transfer area 114 includes a second transfer nip formed between back-up roll 116, drive roll 117 and a second transfer roller 118. Tension roll 150 is disposed at an opposite end of ITM belt 106 and provides suitable tension thereto.

Fuser assembly 120 is disposed downstream of second transfer area 114 and receives media sheets with the unfused toner images superposed thereon. In general terms, fuser assembly 120 applies heat and pressure to the media sheets in order to fuse toner thereto. After leaving fuser assembly 120, a media sheet is either deposited into output media area 122 or enters duplex media path 124 for transport to second transfer area 114 for imaging on a second surface of the media sheet.

Imaging device 100 is depicted in FIG. 1 as a color laser printer in which toner is transferred to a media sheet in a two-step operation. Alternatively, imaging device 100 may be a color laser printer in which toner is transferred to a media sheet in a single-step process—from photoconductive members 110 directly to a media sheet. In another alternative embodiment, imaging device 100 may be a monochrome laser printer which utilizes only a single developer unit 104 and photoconductive member 110 for depositing black toner directly to media sheets. Further, imaging device 100 may be part of a multi-function product having, among other things, an image scanner for scanning printed sheets.

Imaging device 100 further includes a controller 140 and memory 142 communicatively coupled thereto. Though not shown in FIG. 1, controller 140 may be coupled to components and modules in imaging device 100 for controlling same. For instance, controller 140 may be coupled to toner reservoirs 108, developer units 104, photoconductive members 110, fuser assembly 120 and/or LSU 130 as well as to motors (not shown) for imparting motion thereto. It is understood that controller 140 may be implemented as any number of controllers and/or processors for suitably controlling imaging device 100 to perform, among other functions, printing operations.

Still further, imaging device 100 includes a power supply 160. In the example embodiment, power supply 160 is a low voltage power supply which provides power to many of the components and modules of imaging device 100. Imaging device 100 may further include a high voltage power supply (not shown) for provide a high supply voltage to module and components requiring higher voltages.

Figure 2:
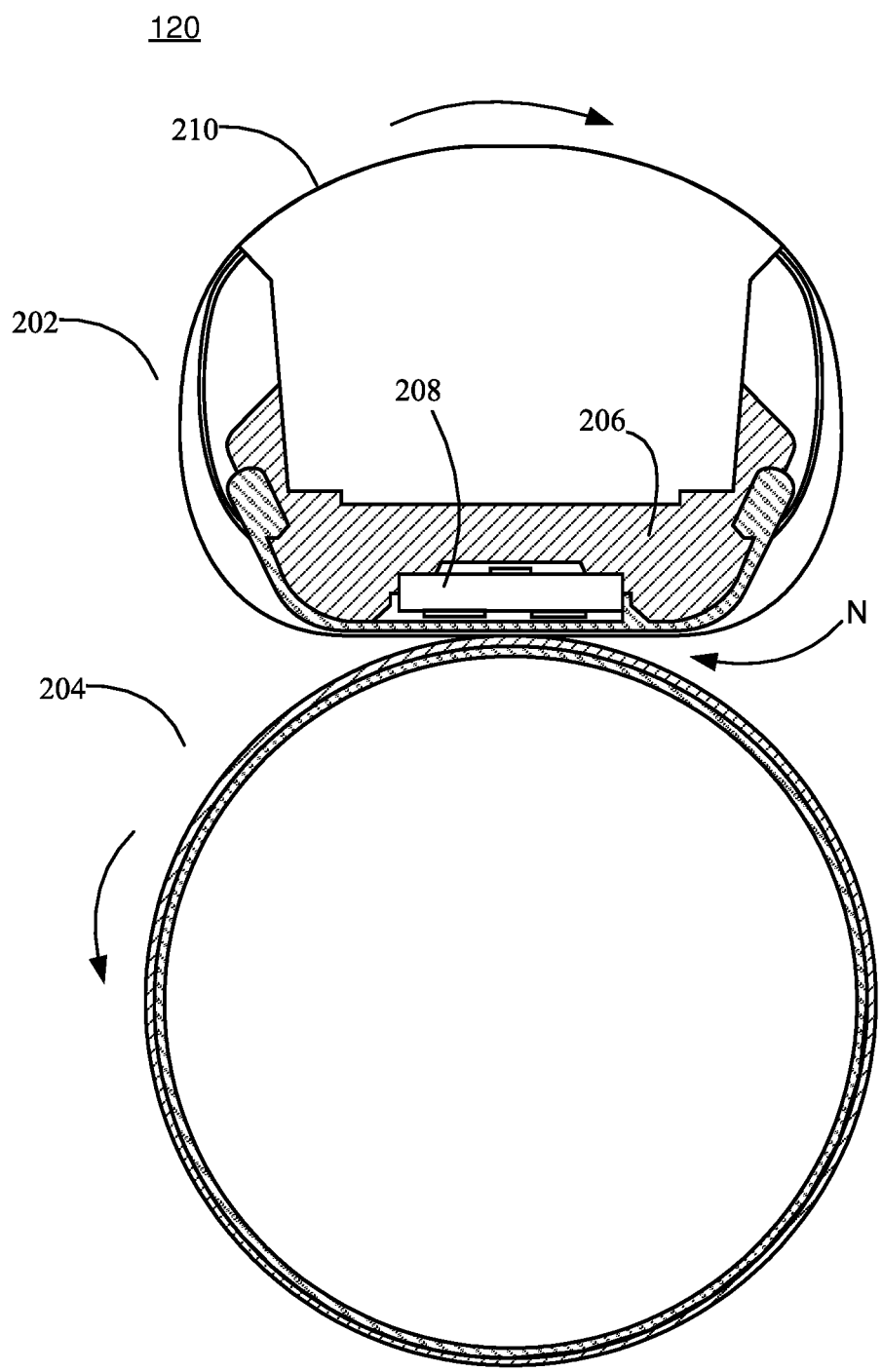
FIG. 2 is a side view of a fuser assembly of FIG. 1, according to an example embodiment.

With respect to FIG. 2, in accordance with an example embodiment, there is shown fuser assembly 120 for use in fusing toner to sheets of media through application of heat and pressure. Fuser assembly 120 may include a heat transfer member 202 and a backup roll 204 cooperating with the heat transfer member 202 to define a fuser nip N for conveying media sheets therein. The heat transfer member 202 may include a housing 206, a heater member 208 supported on or at least partially in housing 206, and an endless flexible fuser belt 210 positioned about housing 206. Heater member 208 may be formed from a substrate of ceramic or like material to which at least one resistive trace is secured which generates heat when a current is passed through it. Heater member 208 may be constructed from the elements and in the manner as disclosed in U.S. patent application Ser. No. 14/866,278, filed Sep. 25, 2015, and assigned to the assignee of the present application, the content of which is incorporated by reference herein in its entirety. The inner surface of fuser belt 210 contacts the outer surface of heater member 208 so that heat generated by heater member 208 heats fuser belt 210. It is understood that, alternatively, heater member 208 may be implemented using other heat-generating mechanisms.

Fuser belt 210 is disposed around housing 206 and heater member 208. Backup roll 204 contacts fuser belt 210 such that fuser belt 210 rotates about housing 206 and heater member 208 in response to backup roll 204 rotating. With fuser belt 210 rotating around housing 206 and heater member 208, the inner surface of fuser belt 210 contacts heater member 208 so as to heat fuser belt 210 to a temperature sufficient to perform a fusing operation to fuse toner to sheets of media.

Fuser belt 210 and backup roll 204 may be constructed from the elements and in the manner as disclosed in U.S. Pat. No. 7,235,761, which is assigned to the assignee of the present application and the content of which is incorporated by reference herein in its entirety. It is understood, though, that fuser assembly 120 may have a different fuser belt architecture or even a different architecture from a fuser belt based architecture. For example, fuser assembly 120 may be a hot roll fuser, including a heated roll and a backup roll engaged therewith to form a fuser nip through which media sheets traverse. The hot roll fuser may include an internal or external heater member for heating the heated hot roll. The hot roll fuser may further include a backup belt assembly. Hot roll fusers, with internal and external heating forming the heat transfer member with the hot roll, and with or without backup belt assemblies, are known in the art and will not be discussed further for reasons of expediency.

Figure 3A:
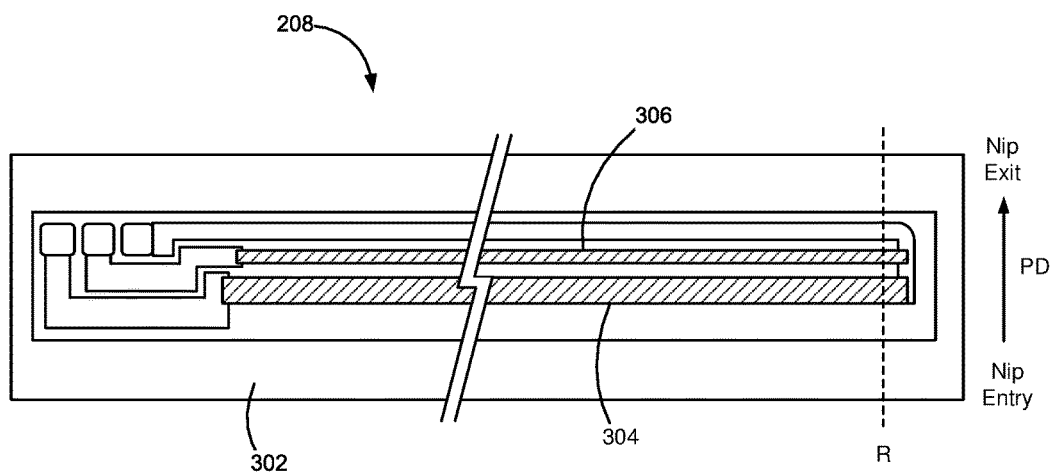
FIGS. 3A and 3B are bottom and top views, respectively, of a heater device of the fuser assembly of FIG. 2, according to an example embodiment.
Figure 3B:
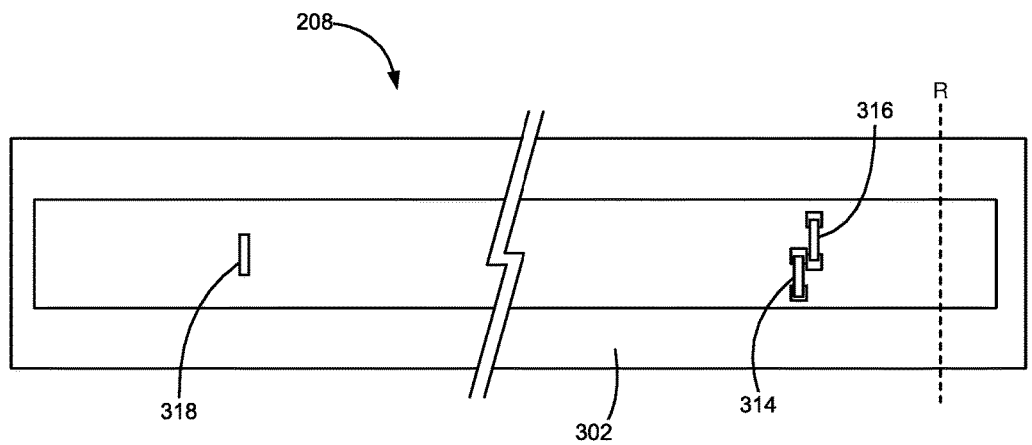

FIGS. 3A and 3B show heater member 208 according to an example embodiment for a reference-edge based media feed system in which the media sheets are aligned in the media feed path of imaging device 100 using a side edge of each sheet. Heater member 208 includes a substrate 302 constructed from ceramic or other like material. Disposed on a bottom surface of substrate 302 in parallel relation with each other are two resistive traces 304 and 306. Resistive trace 304 is disposed on the entry side of fuser nip N and resistive trace 306 is disposed on the exit side of fuser nip N so that the process direction PD of fuser assembly 120 is illustrated in FIG. 3A.

The length of resistive trace 304 is comparable to the width of a Letter sized sheet of media and is disposed on substrate 302 for fusing toner to letter sized sheets. The length of resistive trace 306 is comparable to the width of A4 sized sheet of media and is disposed on substrate 302 for fusing toner to A4 sized sheets. In an example embodiment, the width of resistive trace 304 is larger than the width of resistive trace 306 in order to have different heating zone requirements for different print speeds. In an example embodiment, the width of resistive trace 304 is between about 4.5 mm and about 5.5 mm, such as 5 mm, and the width of resistive trace 306 is between about 2.0 mm and about 2.50 mm, such as 2.25 mm. In general terms, the width of resistive trace 304 is between about two and about three times the width of resistive trace 306. By having such a difference in trace widths, and with the resistivity of resistive trace 304 being substantially the same as the resistivity of resistive trace 304 such that the resistance of trace 304 is less than the resistance of trace 306, resistive trace 304 may be used for lower printing speeds and both resistive traces 304 and 306 may be used for relatively high printing speeds.

In an example embodiment, resistive traces 304, 306 have different power levels. In an example embodiment, resistive trace 304, hereinafter referred to as high power trace 304, has a power level of about 1000 W and resistive trace 306, hereinafter referred to as low power trace 306, has a power level of about 500 W. A plurality of thermistors are disposed on a top surface of substrate 302. Referring to FIG. 3B, thermistor 314 is disposed on the top surface of substrate 302 opposite an area of resistive trace 304 near the lengthwise end of resistive trace 304 that corresponds to the reference edge R of a sheet of media passing through fuser nip N. Similarly, thermistor 316 is disposed on the top surface of substrate 302 opposite resistive trace 306 near the length-wise end of resistive trace 306 that corresponds to the reference edge R of the sheet of media. A third thermistor, thermistor 318, is disposed on the top surface of substrate 302 opposite an area of heater member 208 that does not contact A4 media but contacts Letter sized media. In FIG. 3B, thermistors 314, 316 and 318 are depicted as not including wires for reasons of simplicity and clarity, and it is understood that the thermistors include wires for communicating the temperature-related electrical signals generated thereby. By having thermistors disposed on substrate 302 in this way, resistive traces 304, 306 may be independently controlled so that heater member 208 achieves a more uniform temperature profile from nip entry to nip exit of fuser nip N.

Figure 4:
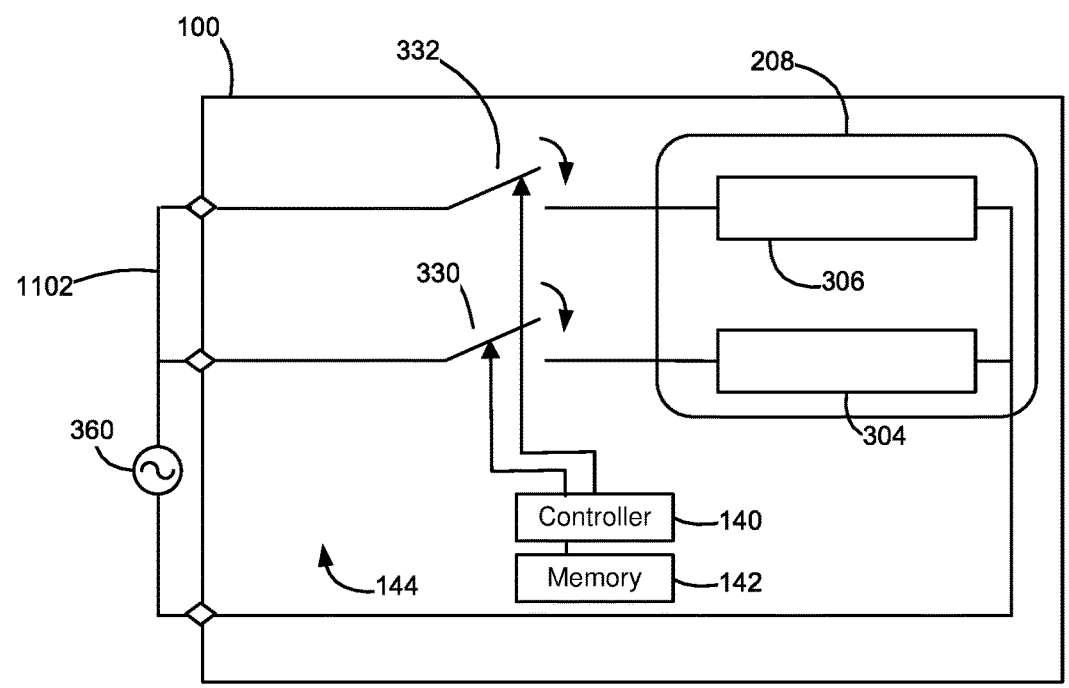
FIG. 4 is a simplified fuser heater control diagram for the heater of FIG. 2, according to another example embodiment.

FIG. 4 illustrates imaging device 100 coupled to an AC power source 360, located external thereto. Within imaging device 100, AC line 1102 is coupled to switches 330 and 332 for providing power thereto. As can be seen, controller 140 controls switches 330 and 332 for controlling the current passing through, and hence the power level of, each resistive traces 304 and 306.

Figure 5:
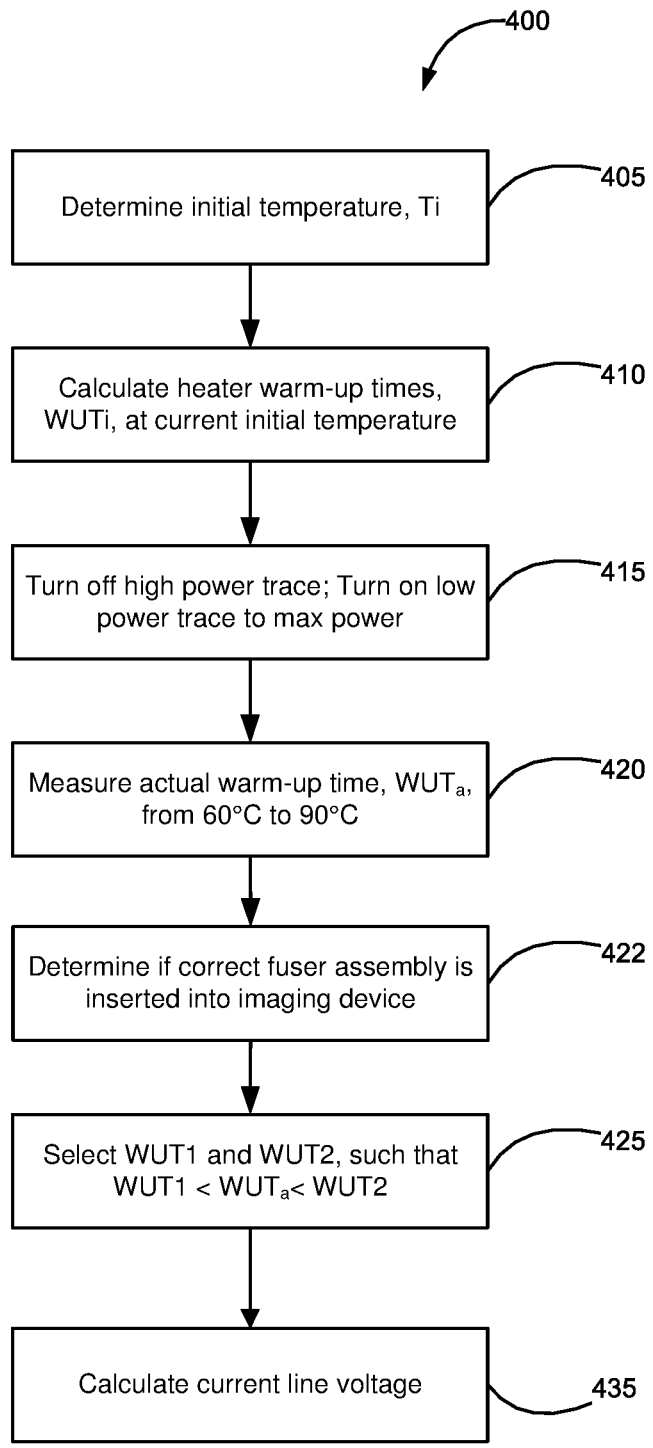
FIG. 5 is a flowchart of an example algorithm for calculating line voltage during the preheating of the fuser assembly of FIG. 2.

An example method 400 for calculating the line voltage powering imaging device 100 will be described with reference to FIG. 5. At block 405, an initial temperature $T_i$ of low power trace 306 of heater member 208 is determined by reading the signal generated by low power trace thermistor 316.

At block 410, the warm-up times $WUT_i$ from the initial temperature $T_i$ of heater member 208 at each of a number of possible line voltages are calculated. Warm-up times $WUT_i$ are calculated using previously measured warm-up times corresponding to each of the possible line voltages stored in Table 1 in memory of imaging device 100, such as memory 142. Table 1 is shown below.

TABLE 1

Predetermined Warm-up Times of Fuser Heater

| Voltage (V) | Voltage Bucket | Heater WUT at 22° C. (ms) | Heater WUT at 48° C. (ms) | Heater WUT at heater temperature $T_i$ (ms) |
|---|---|---|---|---|
| 145 / 290 | Bucket 1 | 235 | 193 | |
| 143 / 286 | Bucket 2 | 268 | 209 | |
| 141 / 282 | Bucket 3 | 280 | 216 | |
| 139 / 278 | Bucket 4 | 290 | 225 | |
| 137 / 274 | Bucket 5 | 300 | 235 | |
| 135 / 270 | Bucket 6 | 314 | 243 | |
| 133 / 266 | Bucket 7 | 332 | 249 | |
| 131 / 262 | Bucket 8 | 350 | 257 | |
| 129 / 258 | Bucket 9 | 366 | 269 | |
| 127 / 254 | Bucket 10 | 382 | 283 | |
| 125 / 250 | Bucket 11 | 400 | 296 | |
| 123 / 246 | Bucket 12 | 420 | 308 | |
| 121 / 242 | Bucket 13 | 442 | 321 | |
| 119 / 238 | Bucket 14 | 466 | 336 | |
| 117 / 234 | Bucket 15 | 492 | 352 | |
| 115 / 230 | Bucket 16 | 521 | 370 | |
| 113 / 226 | Bucket 17 | 553 | 390 | |
| 111 / 222 | Bucket 18 | 586 | 411 | |
| 109 / 219 | Bucket 19 | 621 | 434 | |
| 107 / 214 | Bucket 20 | 657 | 458 | |
| 105 / 210 | Bucket 21 | 698 | 486 | |
| 103 / 206 | Bucket 22 | 744 | 518 | |
| 101 / 202 | Bucket 23 | 793 | 551 | |
| 99 / 198 | Bucket 24 | 846 | 584 | |
| 97 / 194 | Bucket 25 | 902 | 618 | |
| 95 / 190 | Bucket 26 | 966 | 669 | |
| 93 / 186 | Bucket 27 | 1038 | 737 | |
| 91 / 182 | Bucket 28 | 1114 | 800 | |
| 89 / 178 | Bucket 29 | 1196 | 853 | |
| 87 / 174 | Bucket 30 | 1282 | 901 | |
| 85 / 170 | Bucket 31 | 1325 | 925 | |

In Table 1, the first column shows possible supply line voltage pairs, with each pair including a line voltage corresponding to a low voltage (115V) power supply and a line voltage corresponding to a high voltage (230V) power supply. The second column contains voltage bucket values which are used to control imaging device 100 as described in greater detail below. The third column of Table 1 contains the previously measured warm up time of low power trace 306 as heater member 208 heats up from a first predetermined temperature, such as 60° C., to a second predetermined temperature, such as 90° C., for each supply line voltage pair listed in the first column of Table 1, when starting at initial temperature $T_i$ at a third predetermined temperature, such as 22° C. The fourth column of Table 1 contains the measured warm up times of the low power trace 306 to be heated from 60° C. to 90° C. for each line voltage pair, when starting at initial temperature $T_i$ at a fourth predetermined temperature, such as 48° C. The fifth column of Table 1 is used for storing the calculated warm up time $WUT_i$ for each line voltage pair listed in column 1.

Figure 6:
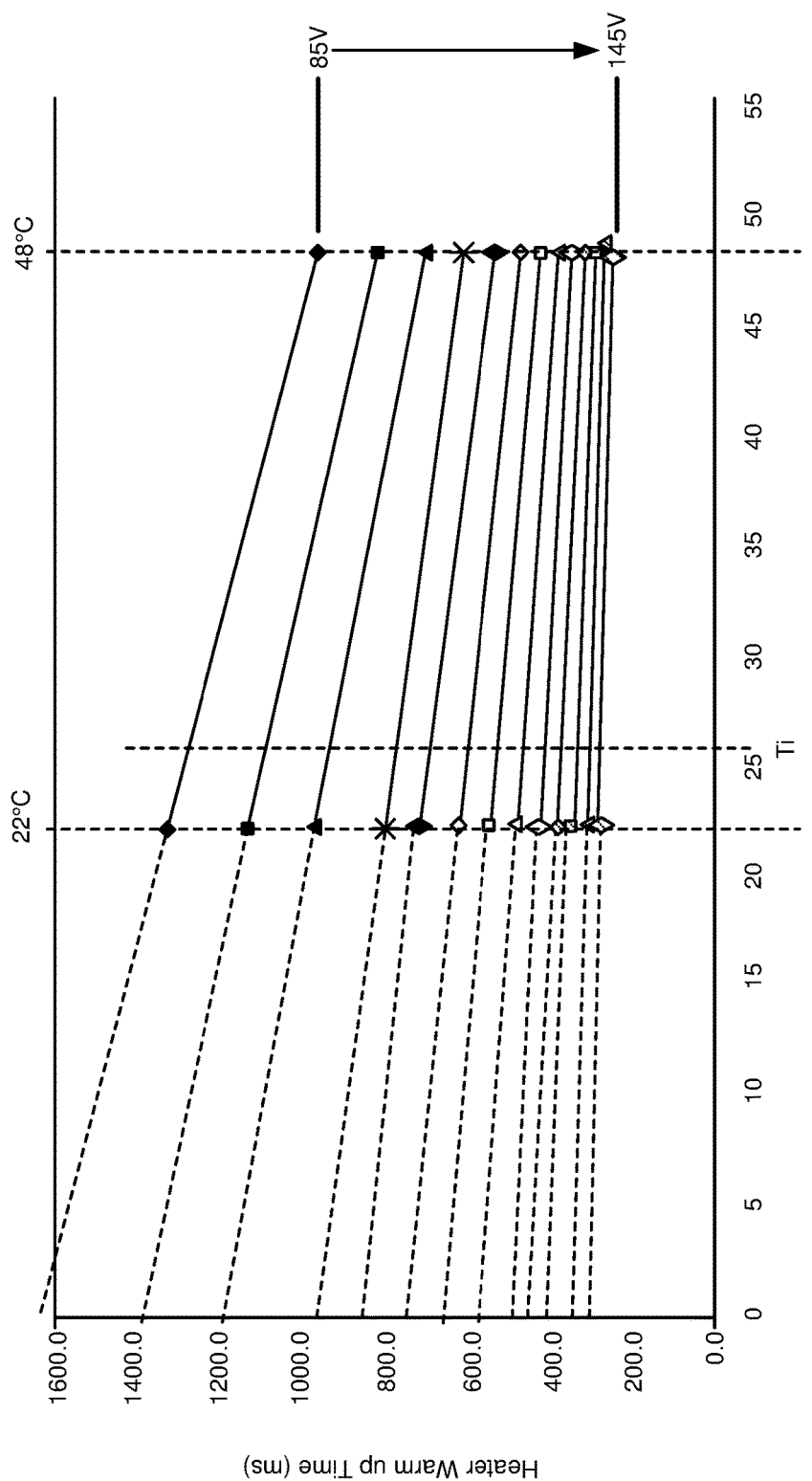
FIG. 6 is a graph showing predetermined warm-up times of the fuser assembly of FIG. 2 as a function of initial heater temperature and line voltage.

The warm-up times $WUT_i$ may be calculated in block 410 by linearly interpolating the previously measured warm up times in columns 3 and 4 in Table 1. FIG. 6. illustrates the calculation of warm-up times $WUT_i$ for the example scenario in which the initial temperature $T_i$ of heater member 208 is 26°. A line segment is formed between the two previously measured warm-up times appearing in the third and fourth columns for each pair of supply voltages, and the y-axis component at the intersection with initial temperature $T_1 = 26°$ is stored in the corresponding fifth column of Table 1. After calculating the warm-up times $WUT_i$ and storing the same in the fifth column of Table 1 at block 410, high power trace 304 remains deactivated and/or unpowered while low power trace 306 is activated or powered near or at maximum power at block 415 by controller 140. The actual warm-up time $WUT_a$ of low power trace 306 from the first predetermined temperature (60° C.) to the second predetermined temperature (90° C.) is then measured at block 420. In another example embodiment, low power trace 306 is deactivated and high power trace 304 is activated at a predetermined fraction, such as about ⅓, of its maximum power at block 415. Further, fuser nip N is kept open in order to reduce or minimize the impact of backup roll 204 on the actual warm up time $WUT_a$ measurement.

At block 422, controller 140 verifies if a correct fuser assembly 120 appears in imaging device 100. That is, controller 140 verifies that fuser assembly 120 is configured for use in an imaging device 100 powered by a high supply voltage and is correctly disposed in such an imaging device 100; and/or that fuser assembly 120 is configured for use in an imaging device 100 powered by a low supply voltage and is correctly disposed in such an imaging device 100. This verification prevents the situation in which a low supply voltage fuser assembly is placed in a high supply voltage imaging device, and vice versa. In an example embodiment, controller 140 performs this verification by comparing the actual warm-up time $WUT_a$ with the smallest and largest values of the calculated warm-up times $WUT_i$ stored in the fifth column of Table 1. If the actual warm-up time $WUT_a$ is shorter than the smallest value of the calculated warm-up times $WUT_i$ controller 140 determines that fuser assembly 120 is configured for use in an imaging device 100 powered by a low supply voltage but imaging device 100 is instead powered by a high supply voltage. Similarly, if the actual warm-up time $WUT_a$ is longer than the largest value of the calculated warm-up times $WUT_i$ in Table 1, controller 140 determines that fuser assembly 120 is configured for use in an imaging device 100 powered by a high supply voltage but imaging device 100 is instead powered by a low supply voltage. In the event either determination is reached, controller 140 will stop the warm-up operation and display an error message on imaging device 100 of the wrong fuser assembly 120 being in imaging device 100. Otherwise, if the actual warm-up time $WUT_a$ is determined by controller 140 to be between the smallest value and the largest value of the calculated warm-up times $WUT_i$, controller 140 determines that the correct fuser assembly 120 has been inserted into imaging device 100 and continues the warm-up operation.

Figure 7:
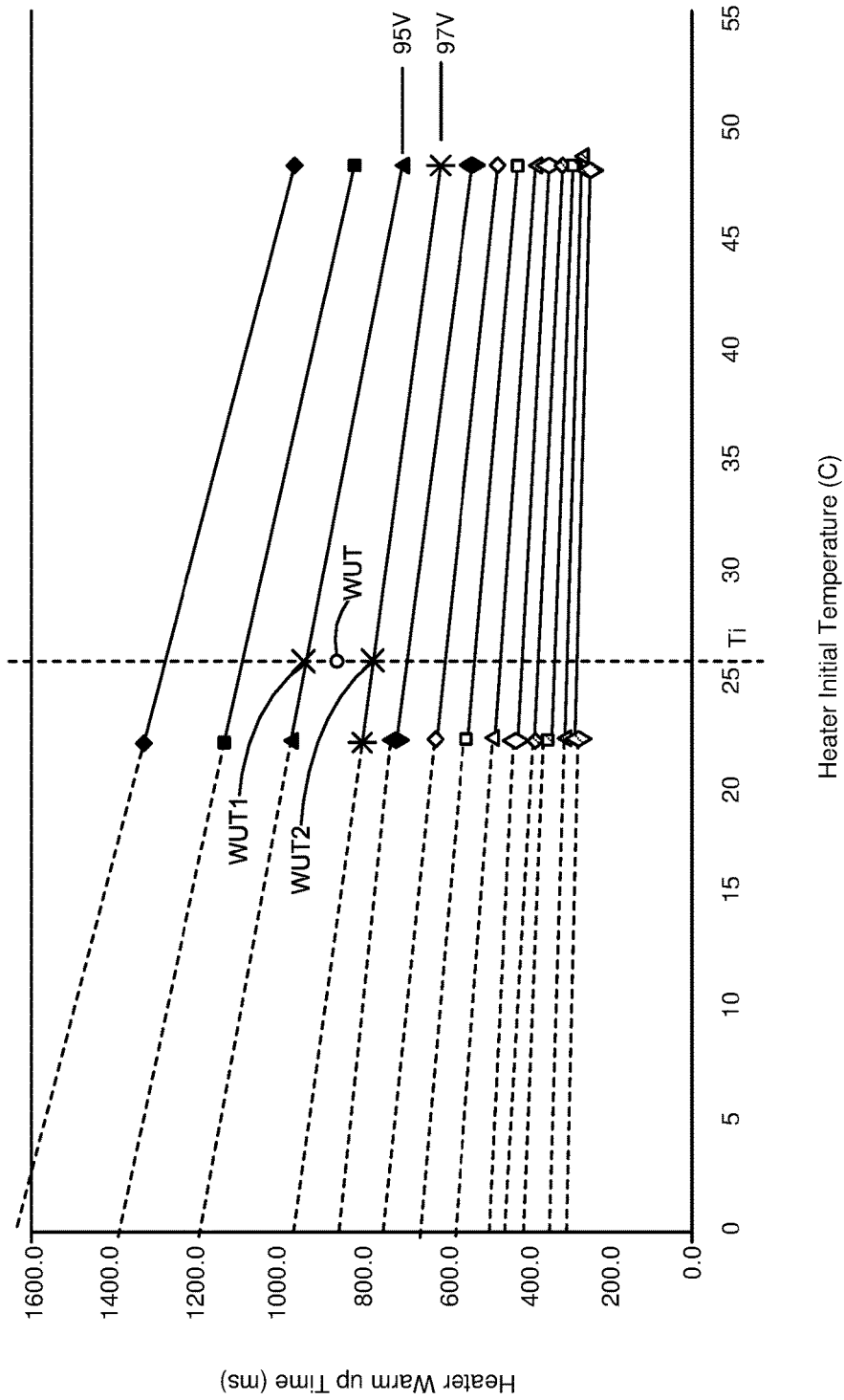
FIG. 7 is a graph showing the application of the example algorithm of FIG. 5 using the graph of FIG. 6.

At block 425, the actual warm-up time $WUT_a$ is compared with the calculated warm-up times $WUT_i$ stored in the fifth column of Table 1. Two calculated warm-up times $WUT_i$, a first warm-up time WUT1 and a second warm-up time WUT2, which are closest to the actual warm-up time WUT are then selected from the previously calculated warm-up times $WUT_i$ stored in Table 1. The first warm-up time WUT1 and second warm-up time WUT2 are selected such that the actual warm-up time $WUT_a$ lies between the first warm-up time WUT1 and the second warm-up time WUT2. That is, the first warm-up time WUT1 is a value in the fifth column of Table 1 that is immediately above the actual warm-up time $WUT_a$ and the second warm-up time WUT2 is the value in the fifth column of Table 1 that is immediately below the measured warm-up time $WUT_a$, as shown in FIG. 7.

At block 435, the line voltage for imaging device 100 is estimated by controller 140. According to an example embodiment, the line voltage estimation uses linear interpolation based on the actual warm-up time $WUT_a$, the first warm-up time WUT1 and second warm-up time WUT2, and the line voltage values corresponding to the first warm-up time WUT1 and second warm-up time WUT2. With respect to the example illustrated in FIGS. 6 and 7, controller 140 estimates the line voltage for imaging device 100 to be approximately 96 v.

With a more accurate line voltage estimation, imaging device 100 is controlled by controller 140 more effectively and with less short and long term concerns. For example, following the estimation of the line voltage in block 435, controller 140 is able to more accurately calculate the fuser ready time and print speed based in part upon the calculated fuser ready time. Further, in controlling imaging device 100 based upon the line voltage estimated in block 435, controller 140 may utilize either the line voltage estimate or the voltage bucket values in the second column of Table 1 corresponding to first warm-up time WUT1 and/or second warm-up time WUT2.

The description of the details of the example embodiments have been described in the context of a color electrophotographic imaging devices. However, it will be appreciated that the teachings and concepts provided herein are applicable to multifunction products employing color electrophotographic imaging.

The foregoing description of several example embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method for controlling a fuser heater of a fuser assembly for an electrophotographic device, the method comprising:

determining, by the electrophotographic device, an initial temperature of the fuser heater;

calculating, by the electrophotographic device, a plurality of warm-up times for heating the fuser heater to a first predetermined temperature based on the initial temperature, and a plurality of previously determined warm-up times stored in memory of the electrophotographic device, the previously determined warm-up times being taken over a plurality of line voltages;

determining, by the electrophotographic device, an actual warm-up time for heating the fuser to the first predetermined temperature from a second predetermined temperature less than the first predetermined temperature;

selecting, by the electrophotographic device, a first calculated warm-up time and a second calculated warm-up time from the plurality of calculated warm-up times, the first calculated warm-up time is a smallest calculated warm-up time that is greater than the actual warm-up time, and the second calculated warm-up time is a largest calculated warm-up time that is less than the actual warm-up time;

determining, by the electrophotographic device, a first line voltage value corresponding to the first calculated warm-up time, and a second line voltage value corresponding to the second calculated warm-up time;

calculating, by the electrophotographic device, a current line voltage based on the actual warm-up time, the first and second calculated warm-up times, and the first and second line voltage values; and controlling an operation of the fuser assembly based upon the calculated current line voltage.

2. The method of claim 1, further comprising heating the fuser heater from the initial temperature to the second predetermined temperature prior to determining the actual warm-up time.

3. The method of claim 2, wherein the difference between the first and second predetermined temperatures is about 30° C.

4. The method of claim 1, wherein the plurality of previously determined warm-up times and the plurality of line voltages are maintained in the memory, and the plurality of calculated warm-up times are stored in a table in the memory of the electrophotographic device.

5. The method of claim 1, wherein calculating the current line voltage includes linearly interpolating based on the actual warm-up time, the first and second calculated warm-up times, and the first and second line voltage values.

6. The method of claim 1, wherein calculating the plurality of warm-up times includes linearly interpolating based on the initial temperature, the previously determined warm-up times and the plurality of line voltages.

7. The method of claim 1, further comprising verifying that the fuser assembly is correctly configured for use in the electrophotographic device, comprising comparing the actual warm-up time to each of a smallest and largest of the calculated warm-up times and determining the fuser assembly is correctly configured based upon the comparisons.

8. The method of claim 7, wherein the verifying further comprises determining the fuser assembly is correctly configured upon a determination that the actual warm-up time is greater than the smallest calculated warm-up time and less than the largest of the calculated warm-up times.

9. An imaging device, comprising:
a photoconductive member;
a developer unit for developing a toner image on the photoconductive member;
at least one toner transfer area for transferring the toner image to a sheet of media as the sheet of media passes through the toner transfer area in a media feed direction along a media feed path of the imaging device;
a fuser assembly positioned downstream of the at least one toner transfer area in the media feed direction for fusing toner transferred to the sheet of media, the fuser assembly including a fuser heater member;
a power supply circuit coupled to the fuser assembly for supplying power thereto; and
a controller coupled to the power supply circuit and the fuser assembly for controlling heat generated by the fuser heater member, and memory coupled to the controller, the controller configured to execute instructions stored in the memory for:
  determining an initial temperature of the fuser heater;
  calculating, a plurality of warm-up times for heating the heater to a first predetermined temperature based on the initial temperature and a plurality of previously determined warm-up times stored in memory of the electrophotographic device, the previously determined warm-up times being taken over a plurality of line voltages;
  determining an actual warm-up time for heating the fuser to the first predetermined temperature from a second predetermined temperature less than the first predetermined temperature;
  selecting a first calculated warm-up time and a second calculated warm-up time from the plurality of calculated warm-up times, the first calculated warm-up time is a smallest calculated warm-up time that is greater than the actual warm-up time, and the second calculated warm-up time is a largest calculated warm-up time that is less than the actual warm-up time;
  determining a first line voltage value corresponding to the first calculated warm-up time, and a second line voltage value corresponding to the second calculated warm-up time;
  calculating a current line voltage based on the actual warm-up time, the first and second calculated warm-up times, and the first and second line voltage values; and
  controlling an operation of the fuser assembly based upon the calculated current line voltage.

10. The imaging device of claim 9, wherein the controller is further configured to execute instructions for heating the fuser heater member from the initial temperature to the second predetermined temperature prior to determining the actual warm-up time.

11. The imaging device of claim 10, wherein the fuser heater member further includes at least one high power resistance trace and at least one low power resistor trace, and wherein the controller is further configured to execute instructions stored in the memory for deactivating the at least one high power trace and activating the at least one low power trace at a maximum or near maximum power level, prior to determining the actual warm-up time.

12. The imaging device of claim 10, wherein the fuser heater member further includes at least one high power resistance trace and at least one low power resistor trace, and wherein the controller is further configured to execute instructions for activating the at least one high power trace at less than or equal to about ⅓ of maximum power and deactivating the at least one low power trace, prior to determining the actual warm-up time.

13. The imaging device of claim 9, wherein the actual warm-up time is a time required for a temperature of the fuser heater member to increase from a first temperature higher than the initial temperature to a second temperature.

14. The imaging device of claim 13, wherein the difference between the first and second temperatures is about 30° C.

15. The imaging device of claim 9, wherein the plurality of previously determined warm-up times and the plurality of line voltages are maintained in the memory, and the plurality of calculated warm-up times are stored in a table in the memory of the electrophotographic device.

16. The imaging device of claim 9, wherein the controller is further configured to execute instructions stored in the memory for calculating the current line voltage by linearly interpolating based on actual warm-up time, the first and second calculated warm-up times, and the first and second line voltage values.

17. The imaging device of claim 9, wherein the plurality of line voltage values comprises about 31 line voltage values.

18. The imaging device of claim 9, wherein the controller is further configured to execute instructions stored in the memory for calculating the plurality of warm-up times by linearly interpolating based on the initial temperature, the previously determined warm-up times at predetermined temperatures, and a plurality of line voltage values stored in a memory of the electrophotographic device.

19. The imaging device of claim 9, wherein the controller is further configured to execute instructions stored in the memory for verifying that the fuser assembly is correctly configured for use in the imaging device, comprising comparing the actual warm-up time to each of a smallest and largest of the calculated warm-up times and determining the fuser assembly is correctly configured based upon the comparisons.

20. The imaging device of claim 19, wherein the controller verifies that the fuser assembly is correctly configured for use in the imaging device upon a determination that the actual warm-up time is greater than the smallest calculated warm-up time and less than the largest of the calculated warm-up times.

\* \* \* \* \*